(No Model.) 2 Sheets—Sheet 2.
H. P. DREW.
GAS AND LAMP BRACKET.
No. 300,583. Patented June 17, 1884.
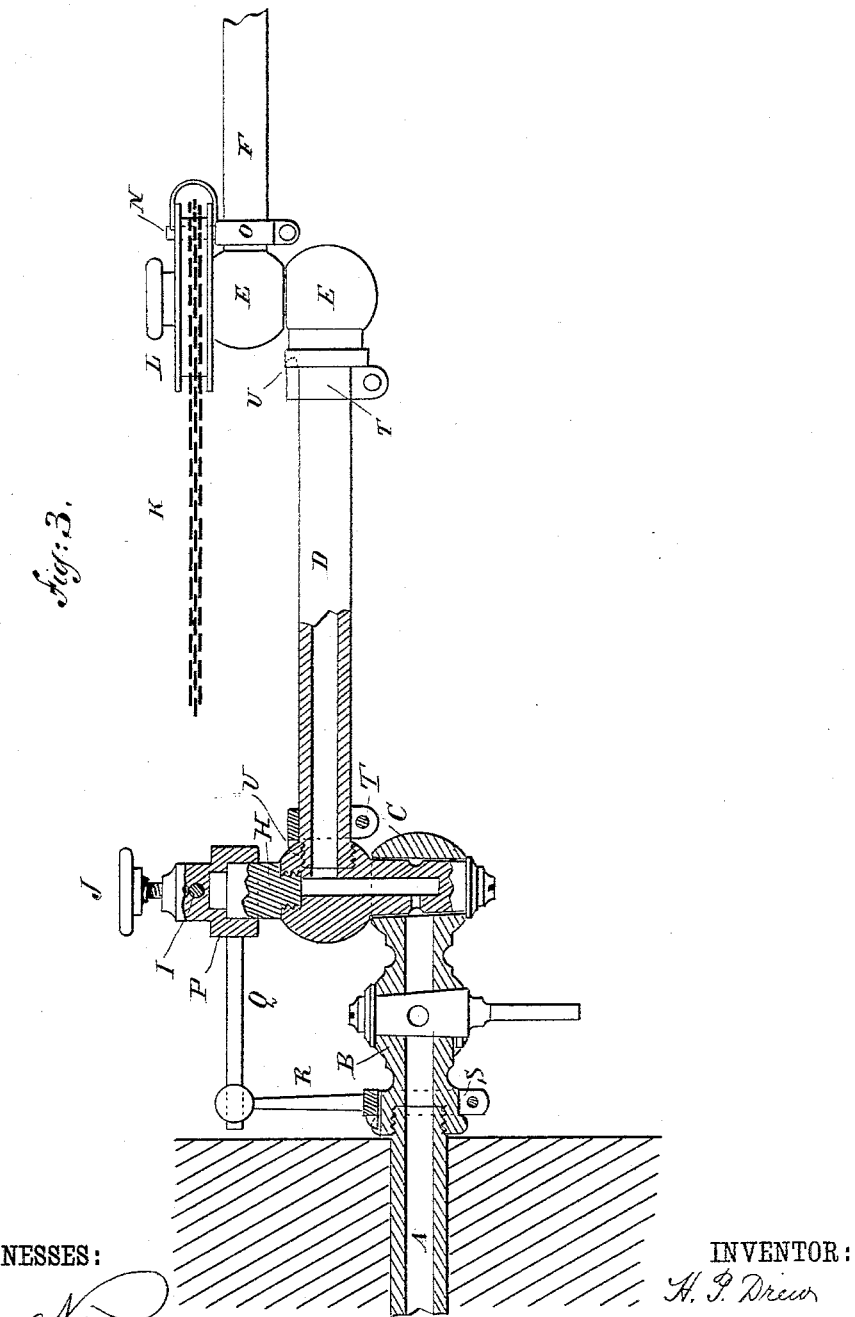
WITNESSES:
INVENTOR:
H. P. Drew
BY Munn & Co
ATTORNEYS.

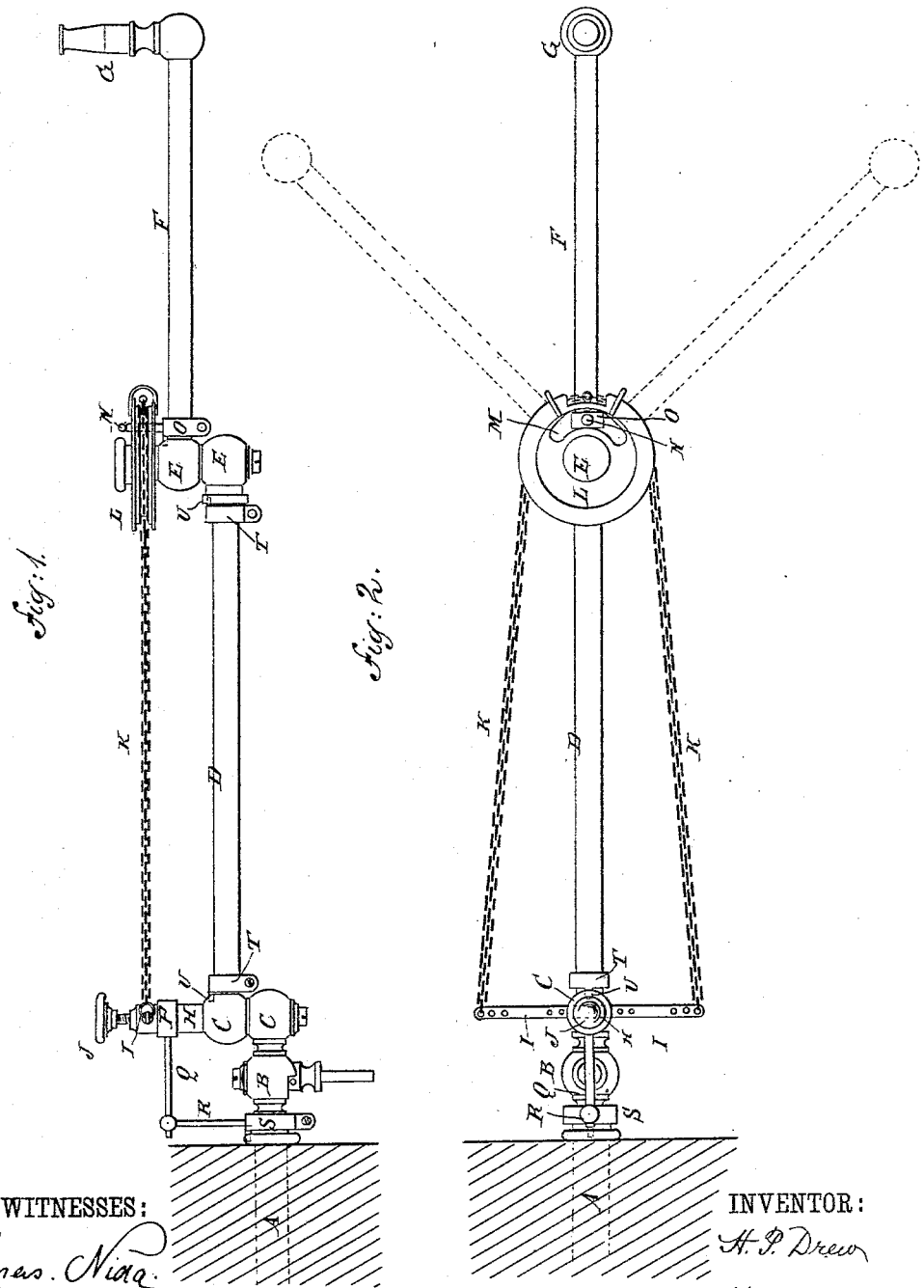

United States Patent Office.

HENRY PHILIP DREW, OF NEW YORK, N. Y.

GAS AND LAMP BRACKET.

SPECIFICATION forming part of Letters Patent No. 300,583, dated June 17, 1884.

Application filed January 3, 1884. (No model.)

*To all whom it may concern:*

Be it known that I, HENRY PHILIP DREW, of the city, county, and State of New York, have invented a new and useful Improvement in Two-Jointed Gas and Lamp Brackets, of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improvement. Fig. 2, Sheet 1, is a plan view of the same; and Fig. 3, Sheet 2, is a side elevation of my improvement, partly in section.

The object of this invention is to prevent gas-burners and lamps from being swung against the walls or against window-curtains and injuring or setting fire to said walls or curtains.

The invention consists in a two-jointed bracket constructed with a cross-bar secured adjustably to the inner joint, and connected by a chain with a wheel secured to the outer joint, whereby the pipe between the said joints can be held stationary or allowed to move to any desired distance toward either side. In the wheel secured to the outer joint is formed a curved slot to receive a pin secured to the outer pipe to limit the lateral movement of the said pipe. The inner joint is strengthened against the pull of the chain and the weight of the bracket by rods connected with the said bracket and its support. The pipe is prevented from turning by clips secured to the said pipe, and provided with toes to engage with recesses in the said joints, as will be hereinafter fully described.

I will describe my improvement as applied to gas-brackets, but do not limit myself to that use, as it can be applied with equal facility and advantage to lamp-brackets.

A represents the end of a gas-pipe, which is provided with a cock, B, in the ordinary manner, and with which is connected by a joint, C, the end of the pipe D.

To the end of the pipe D is connected, by a joint, E, the end of a pipe, F, to the other end of which is attached the burner G.

As thus far described there is nothing new in the construction.

To the pivot of the joint C is attached, or upon it is formed, a post, H, upon the upper end of which is placed a loose cap, P, having a cross-perforation in its upper end, in which is inserted a sliding cross-bar, I, secured in place by a set-screw, J, passing down through the upper end of the said post H.

To the ends of the cross-bar I are attached the ends of a chain, K, the middle part of which passes around the grooved wheel L, attached to the upper end of the pivot of the joint E, and to which the center of the said chain is attached. In the wheel L is formed a curved slot, M, to receive a pin, N, secured to the pipe F by a clip, O, to limit the movement of the said pipe F, as indicated in dotted lines in Fig. 2. When the cross-bar I is so adjusted as to have equal arms, as shown in Fig. 2, the pipe D will be held stationary; but by adjusting the said cross-bar to have unequal arms the pipe D can be swung toward the long arm for a greater or less distance, but not toward the short arm, the amount of movement depending upon the adjustment of the said cross-bar I.

With the cap P is connected the end of a rod, Q, the other end of which is attached to the upper end of a rod, R. The lower end of the rod R is secured to the pipe A by a clip, S. With this construction the rods Q R strengthen the joint C against the pull of the chain K and the weight of the pipes D F, and hold the cap P from turning. The pipe D has clips T secured to its ends, and which are made with toes U to enter recesses in the parts of the joints C E, with which the ends of the said pipe are connected, so as to prevent the pipe D from turning.

The adjustable cross-bar, the cap carrying said cross-bar, and the means for preventing the cap from turning form no part of this application, the same being shown and described in an application of even date, Serial No. 116,317.

Having thus described my invention, I claim as new and desire to secure by Letters Patent—

1. In a two-jointed bracket, the combination, with the joints C E, the perforated cap P, secured upon the upper pivot of the joint C to prevent its rotating thereon, and the adjustable cross-bar, of the chain K and the wheel L, substantially as herein shown and described.

2. In a two-jointed bracket, the combination, with the adjustable bar I, means for preventing its bearing from turning, and the chain K, of the wheel L, connected with the outer joint, and having the curved slot M, and the outer pipe F, provided with the pin N, substantially as herein shown and described.

3. In a two-jointed bracket, the combination, with the cap P, the joint C, and the pipe A, of the rods Q R and the band or clip S, substantially as herein shown and described, whereby the said joint will be strengthened against the pull of the chain and the weight of the bracket, as set forth.

4. In a two-jointed bracket, the combination, with the pipe D and the joints C E, of the clips T, having toes U, substantially as herein shown and described, whereby the said pipe will be prevented from turning, as set forth.

HENRY PHILIP DREW.

Witnesses:
JAMES T. GRAHAM,
EDGAR TATE.